(12) United States Patent
Akatsuka et al.

(10) Patent No.: US 6,502,691 B2
(45) Date of Patent: Jan. 7, 2003

(54) CARRIAGE FOR AN ENDLESS CONVEYOR AND A CONVEYING MECHANISM FOR SUCH A CARRIAGE

(76) Inventors: Isamu Akatsuka, c/o S.D. Engineering Ltd., 1-14, Nishisuehiro-cho, Yokkaichi-City, Mie 510-8503 (JP); Yuji Nakano, c/o S.D. Engineering Ltd., 1-14, Nishisuehiro-cho, Yokkaichi-City, Mie 510-8503 (JP); Yoshitomo Takano, c/o S.D. Engineering Ltd., 1-14 Nishisuehiro-cho, Yokkaichi-City, Mie 510-8503 (JP)

(*) Notice: Subject to any disclaimer, the term of this patent is extended or adjusted under 35 U.S.C. 154(b) by 22 days.

(21) Appl. No.: 09/758,650

(22) Filed: Jan. 11, 2001

(65) Prior Publication Data

US 2001/0008202 A1 Jul. 19, 2001

(30) Foreign Application Priority Data

Jan. 17, 2000 (JP) .................................. 2000-008299

(51) Int. Cl.⁷ .............................................. B65G 35/08
(52) U.S. Cl. .................. 198/795; 198/465.2; 198/465.3
(58) Field of Search .............................. 198/795, 465.2, 198/465.3

(56) References Cited

U.S. PATENT DOCUMENTS

| | | | | |
|---|---|---|---|---|
| 2,304,381 A | * | 12/1942 | Shallock et al. | 198/795 |
| 2,789,683 A | * | 4/1957 | Stahl | 198/795 |
| 3,848,726 A | * | 11/1974 | Wiemer | 198/795 |
| 3,858,519 A | * | 1/1975 | Masino et al. | 198/795 |
| 4,165,162 A | * | 8/1979 | Frey | 198/795 |
| 4,362,498 A | * | 12/1982 | Harry et al. | 425/526 |
| 4,825,111 A | * | 4/1989 | Hommes et al. | 198/465.2 |
| 4,947,978 A | * | 8/1990 | Rhodes | 198/465.1 |
| 5,012,917 A | * | 5/1991 | Gilbert et al. | 198/465.2 |
| 5,335,767 A | | 8/1994 | Killer et al. | |
| 5,529,168 A | * | 6/1996 | Soriano et al. | 198/465.2 |
| 6,202,829 B1 | * | 3/2001 | Van Dyke et al. | 198/465.2 |

FOREIGN PATENT DOCUMENTS

| | | |
|---|---|---|
| EP | 0 339 136 | 11/1989 |
| EP | 1 029 815 | 8/2000 |
| GB | 1 248 425 | 10/1971 |

* cited by examiner

*Primary Examiner*—Douglas Hess (57) ABSTRACT

A conveyor is provided that can easily accommodate a change in specification of stations. Carriages (100) are coupled by carriage couplers (200, 210). Driving units (20) are provided to move entire coupled units (B1, B2) together by driving some of the coupled carriages (100). A distance of conveyance can be changed and a change in specification can be easily coped with only by rearranging the driving units (20).

15 Claims, 12 Drawing Sheets

CARRIAGE FOR AN ENDLESS CONVEYOR AND A CONVEYING MECHANISM FOR SUCH A CARRIAGE

BACKGROUND OF THE INVENTION

1. Field of the Invention

The present invention relates to a carriage for an endless conveyor and to a conveying mechanism for such a carriage.

2. Description of the Related Art

An endless conveyor is used in a production line to process work that is being circulated from one station to another. The endless conveyor includes carriages that circulate from one station to another along a conveyance path that is oblong in plan view. The endless conveyor further includes a driving unit for circulating the carriages along the conveyance path. The driving unit has a pair of sprockets and a driving source for driving one of the sprockets. An endless chain is mounted between the sprockets, and the carriages are connected with the chain. The chain conventionally has been provided with joints at specified intervals and the respective carriages are provided with coupling members that can be coupled with the joint.

Many kinds of products often are produced on a single production line. For example, to produce automotive wiring harnesses, it is necessary to set specifications individually according to the lengths of wires of the wiring harnesses, the number of connectors, the number of contacts of the connectors, etc. Some production modes require several kinds of wiring harnesses to be produced simultaneously in one production line. Accordingly, it is sometimes necessary to change the setting of the stations and to change the conveyance paths as a vehicle type and product number are changed, or as the quantity of production is increased or decreased. In these cases, frequent changes to the length of the chain are necessary. Frequent connections and disconnections between the coupling members of the carriages and the joints of the chain also are required in the prior art conveyor that has a plurality of carriages coupled with the joints of the endless chain. Considerable time and labor is required to change the specification and the setup, and, as a result, productivity is poor. Accordingly, there has been an increasing demand in recent years to facilitate changing the number of stations in a production line.

In view of the above, an object of the present invention is to provide a carriage for an endless conveyor in which the specification can be changed easily. Another object of the invention is to provide a conveying mechanism for such a carriage.

SUMMARY OF THE INVENTION

The subject invention is directed to a carriage for an endless conveyor that has an endless conveyance path. The conveyance path is comprised of at least two substantially linear paths and turning paths connecting the opposite ends of the substantially linear paths. Carriages are driven by a driving unit of the conveyor to circulate along the conveyance path in a predetermined conveyance direction. The carriage comprises a torque input member for receiving a torque from the driving unit and for moving the carriage in the conveyance direction. The carriage further comprises a carriage coupling means for connecting carriages such that the torque received from the driving unit by one of the carriages on the conveyance path can be transmitted to the succeeding carriages. The carriage coupling means separates the carriage from the succeeding carriage when this carriage moves from one linear path to the turning path. The carriage coupling means also couples the separated carriage with the preceding carriage when the carriage moves from the turning path to another linear path.

According to a preferred embodiment, the carriage coupling means comprises at least a driving member and a driven member. The driving member preferably comprises of a rotatable cam on one carriage and the driven member comprises projections mounted on the adjacent carriage. The projections are spaced apart in the longitudinal direction of the carriages and are formed with corresponding cam surfaces so that the rotatable cam can be fitted into and withdrawn from an engaging space defined between the projections.

The cam surfaces of the projections preferably can transmit a force of the rotatable cam for moving substantially along the longitudinal direction of the carriage. The force is transmitted to the other carriage on which the driven member is mounted. The cam surfaces of the projections also can permit the rotatable cam to be fit into and withdrawn from the engaging space if the rotatable cam moves in a direction at an angle different from 0° or 180°, preferably substantially normal to the longitudinal direction.

The carriage may further comprise a torque input member having a linear movement input member for transmitting the output of a linearly driving member of the endless conveyor to the carriage. The linear movement input member can be coupled detachably to the linearly driving member, and may comprise a chain mounted on the carriage. The torque input member also includes a turning movement input member for transmitting a torque of a turning member of the endless conveyor to the carriage for turning the carriage. The turning movement input member is detachably coupled to the turning member while the turning member is running, and may comprise a cam follower and a rotatable cam that is detachably engageable with the cam follower According to the present invention, there is further provided a conveying mechanism for circulating the above-described carriages in a predetermined conveyance direction along an endless conveyance path. The conveyance path is comprised of a pair of substantially linear paths and turning paths connecting the opposite ends of the substantially linear paths. The conveying mechanism comprises at least one driving unit for driving the carriages, and preferably two driving units provided at the opposite ends of the conveyance path and between the substantially linear paths. More particularly, a plurality of the carriages may be connected into coupling units that extend along the linear paths. The driving units comprise turning means for separating the carriages at downstream ends of coupled units and turning them along the turning paths. The conveying mechanism further includes linear movement output members that operate in synchronism with the turning means to convey the downstream ends of the coupled units to the turning means.

The coupled units can be formed by coupling a plurality of carriages in series, and the series of the carriages can be driven along the conveyance path by driving only some carriages. The carriage coupling means separates the carriage from the succeeding carriage when the carriage moves from one linear path to the turning path and couples the separated carriage with the preceding carriage when it moves from the turning path to another linear path. Only the carriages that are displacing from the linear paths to the turning paths can be separated from the coupled units. These carriages then are turned individually and can be coupled with the ends of the preceding coupled units after turning. Accordingly, the carriages can be circulated by providing only the pair of driving units at the opposite ends of the conveyance path and driving the downstream ends of the forward moving coupled unit and the returning coupled unit. As a result, the conveyance path can be changed relatively easily merely by changing the spacing between the pair of driving units and the number of the carriages that are coupled.

The conveying mechanism may comprise a plurality of base blocks arranged one after the other. The base blocks comprise path-defining means for defining the conveyance path on the base blocks. The conveyance path can be changed by changing the number of blocks. Thus, a change in specification can be accommodated easily merely by changing the number of the blocks. The blocks preferably are units that have lengths corresponding to stations.

The conveyance path preferably is formed on a table having a specified height. Thus the height of the carriages can be reduced as much as the height of the table, and the carriages can be smaller. Further, there is no possibility of damaging a floor surface and maintenance, such as cleaning, can be facilitated.

In the respective embodiments and modes described above, the carriages need not have the same specification. For instance, carriages having lengths at a ratio of 1:2 may be alternately arranged and conveyed to produce products having a plurality product numbers.

These and other objects, features and advantages of the present invention will become apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENT

Figure 1:
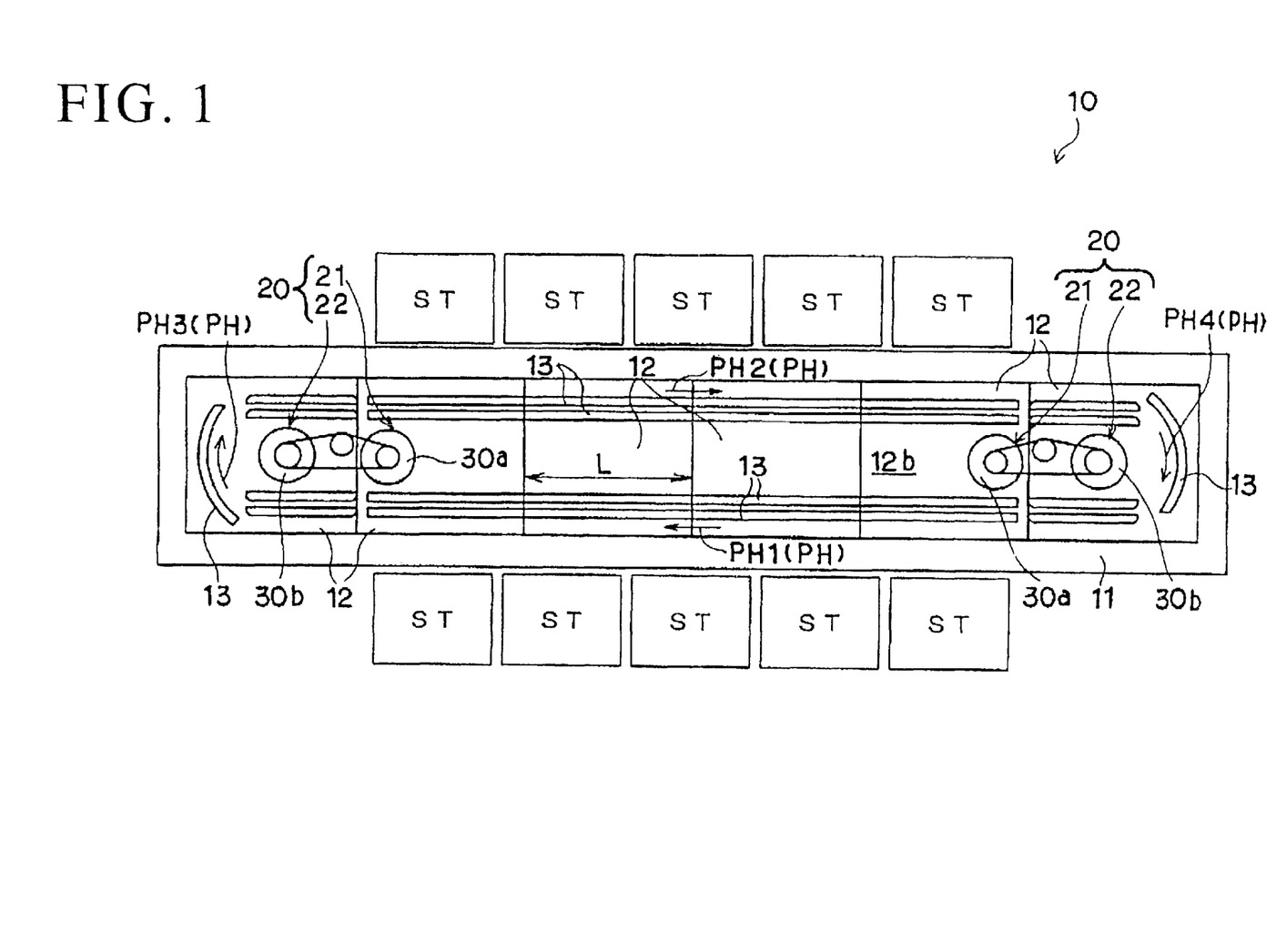
FIG. 1 is a schematic plan view showing a schematic construction of an endless conveyor according to one embodiment of the invention.

An endless conveyor in accordance with the invention is identified by the numeral 10 in FIG. 1. The endless conveyor 10 is provided with a table 11 and base blocks 12 placed one after another on the table 11.

The table 11 preferably is a pedestal with a substantially rectangular plan view that conforms substantially to operation steps of products to be assembled. A plurality of stations ST are set at opposite sides of the table 11 with respect to its widthwise direction and conform with various operation steps (e.g. wire laying step, connector connecting step, external parts mounting step, testing step, etc.) for assembling a wiring harness. Carriages 100 circulate from station to station in the order of the operation steps.

Figure 3:
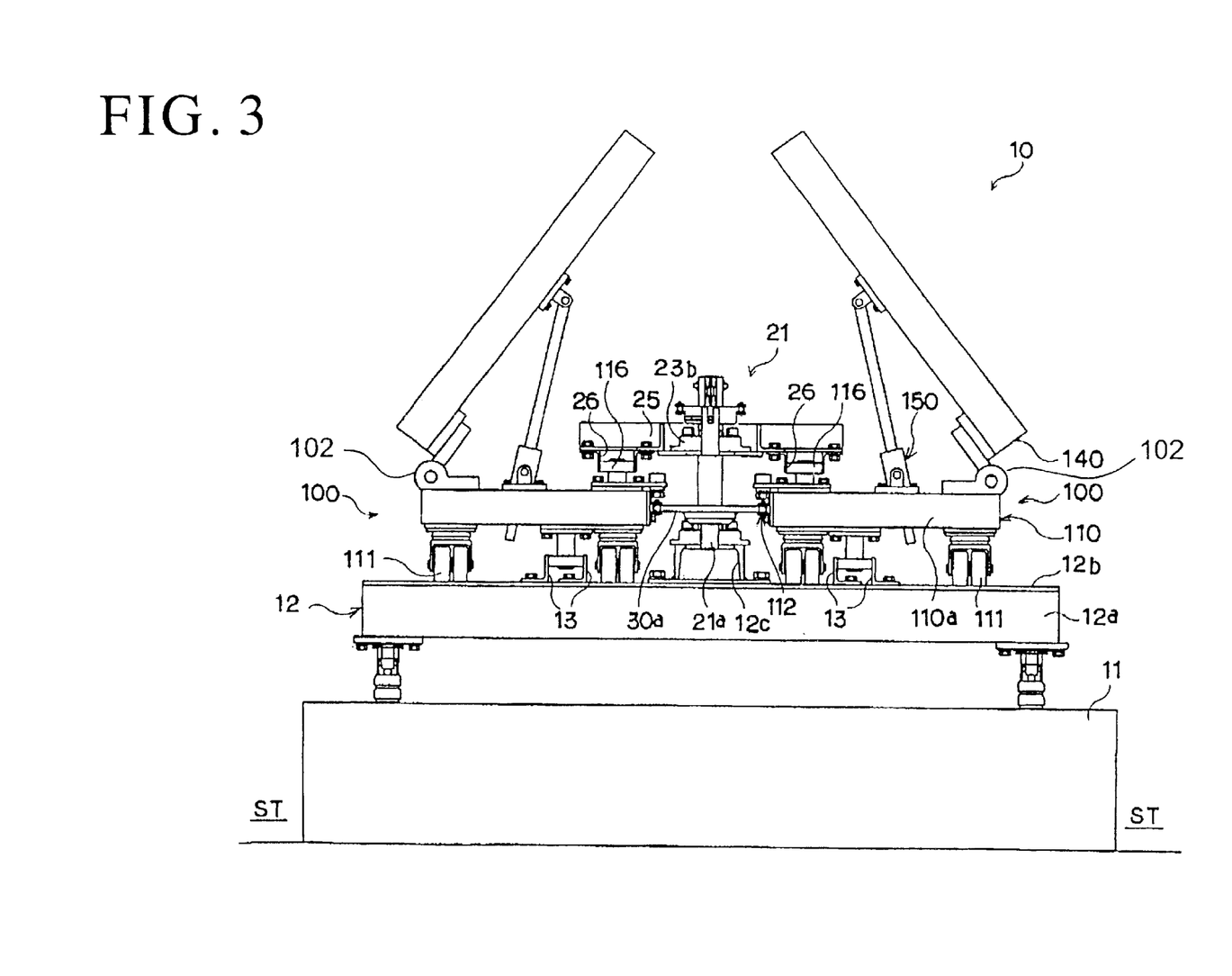
FIG. 3 is a front view of the embodiment of FIG. 1.

Each base block 12 is formed by assembling substantially rectangular pipes 12a into a frame and securing a base plate 12b to the upper surface of the assembled frame (see FIG. 3). Dimensions L of the base blocks 12 along the longer sides of the table 11 are substantially equal and substantially correspond to the length of the stations ST. Angles or brackets 13 are secured to the upper surface of the base plate 12b of each base block 12. The angles 13 form part of a substantially continuous conveyance path PH. The conveyance path PH includes a forward path PH1, a return path PH2 and turning paths PH3, PH4. Driving units 20 are arranged at the opposite ends of the conveyance path PH and between the forward path PH1 and the return path PH2. Each driving unit 20 includes a pair of sprocket units 21, 22, which preferably are substantially opposed to each other in the longitudinal direction of the table 11.

Figure 2:
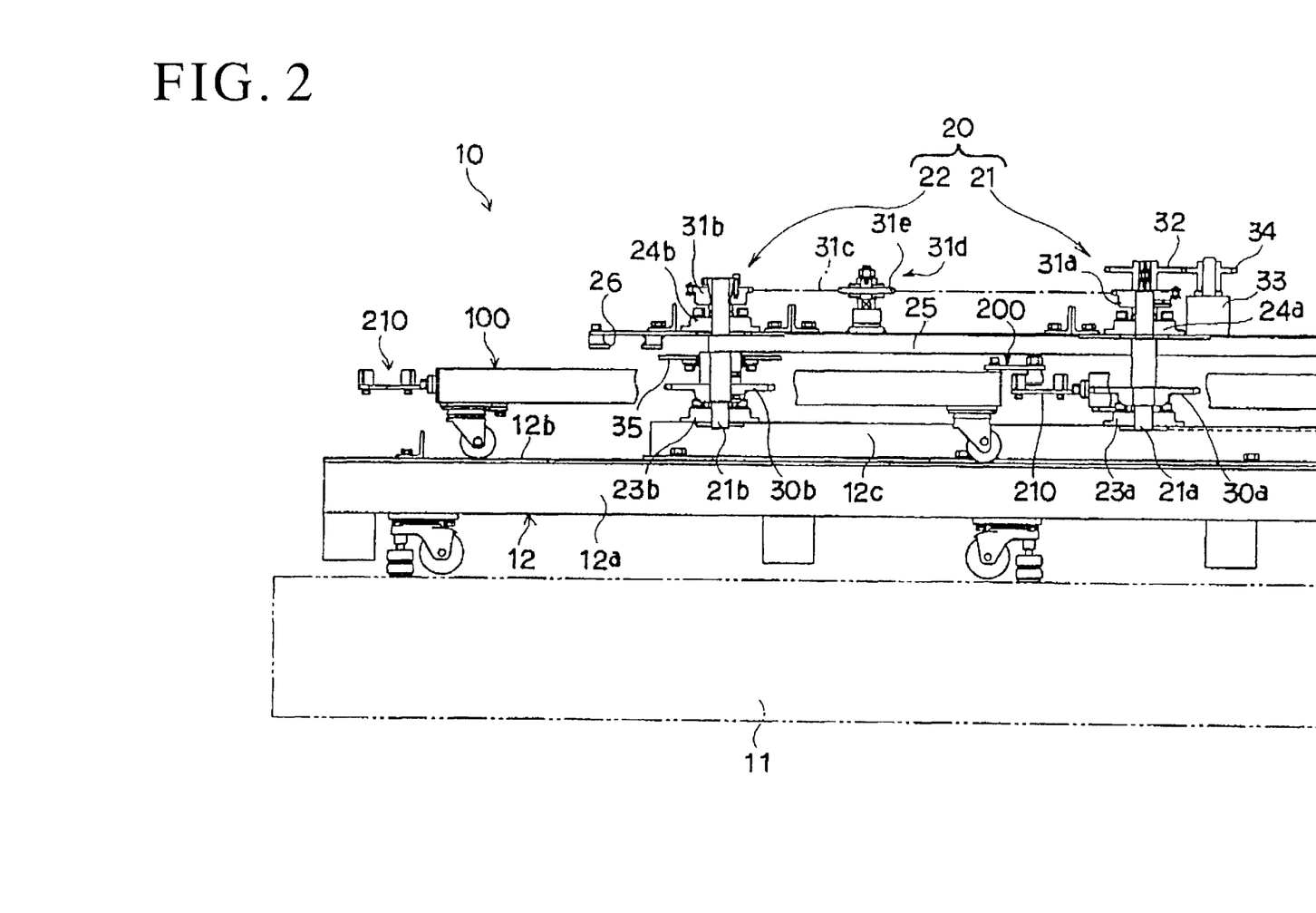
FIG. 2 is an enlarged partial side view showing an essential portion of FIG. 1.

With reference to FIGS. 2 and 3, the sprocket units 21, 22 have shafts 21a, 21b that are mounted for rotation on bearings 23a, 23b. The bearings 23a, 23b, in turn, are mounted to a mounting frame 12c secured to the upper surfaces of the corresponding base blocks 12, respectively. Intermediate parts of the shafts 21a, 21b support an upper guide cover 25 via the bearings 23a, 23b. Guide rails 26 are secured to the lower surface of the upper guide cover 25 and are adapted to guide cam rollers 116 of the carriage 100, as described later. Although not specifically shown, the upper guide cover 25 also is supported by the mounting frame 12c preferably via stays.

Output sprockets 30a, 30b define linear movement output members and are fixed between the mounting frame 12c of the sprocket units 21, 22 and the upper guide cover 25. The output sprockets 30a, 30b convey the conveyance carriage 100, as described later. The output sprockets 30a, 30b are at the same height, so that they can drive the carriage 100 linearly by meshing with the same input chain 112 on the carriage 100, as described below.

Sprockets 31a, 31b are secured to the shafts 21a, 21b in positions above the upper guide cover 25 to rotate the shafts 21a, 21b. The sprockets 31a, 31b are coupled via a chain 31c and are rotated in the same direction by the same driving source. In the illustrated embodiment, the upper guide cover 25 is provided with a sprocket unit 31d for regulating a tension. A sprocket 31e of the sprocket unit 31d is coupled with the chain 31c to regulate a tension of the chain 31c.

A gear 32 for inputting a torque is fixed at the upper end of the shaft 21a of the sprocket unit 21 that is located more inwardly with respect to the longitudinal direction of the table 11. An output gear 34 of a driving motor 33 meshes with and drives the gear 32. By this arrangement, the sprocket unit 21 receives a torque of the motor 33 and hence rotates the sprocket 31a, the shaft 21a and the output sprocket 30a. The sprocket 31a drives the chain 31c, which in turn rotates the sprocket 31b of the other sprocket unit 22. The sprocket 31b is fixed to the shaft 21b and hence rotates the shaft 21b, which, in turn, rotates the output sprocket 30b.

The driving unit 20 preferably is provided at each of the opposite ends of the oblong conveyance path PH. The motor 33 of each driving unit 20 is controlled by an unillustrated controller, which drives the output sprockets 30a, 30b at the same peripheral speed.

The shaft 21b of the sprocket unit 22 is arranged concentrically with a center of an arc of the turning path PH3 (PH4), and has a cam follower 35 secured to its outer surface. As described in detailed later, the cam follower 35 is a turning movement output member for turning the carriage 100 in cooperation with the output sprocket 30b of the sprocket unit 22.

Figure 4:
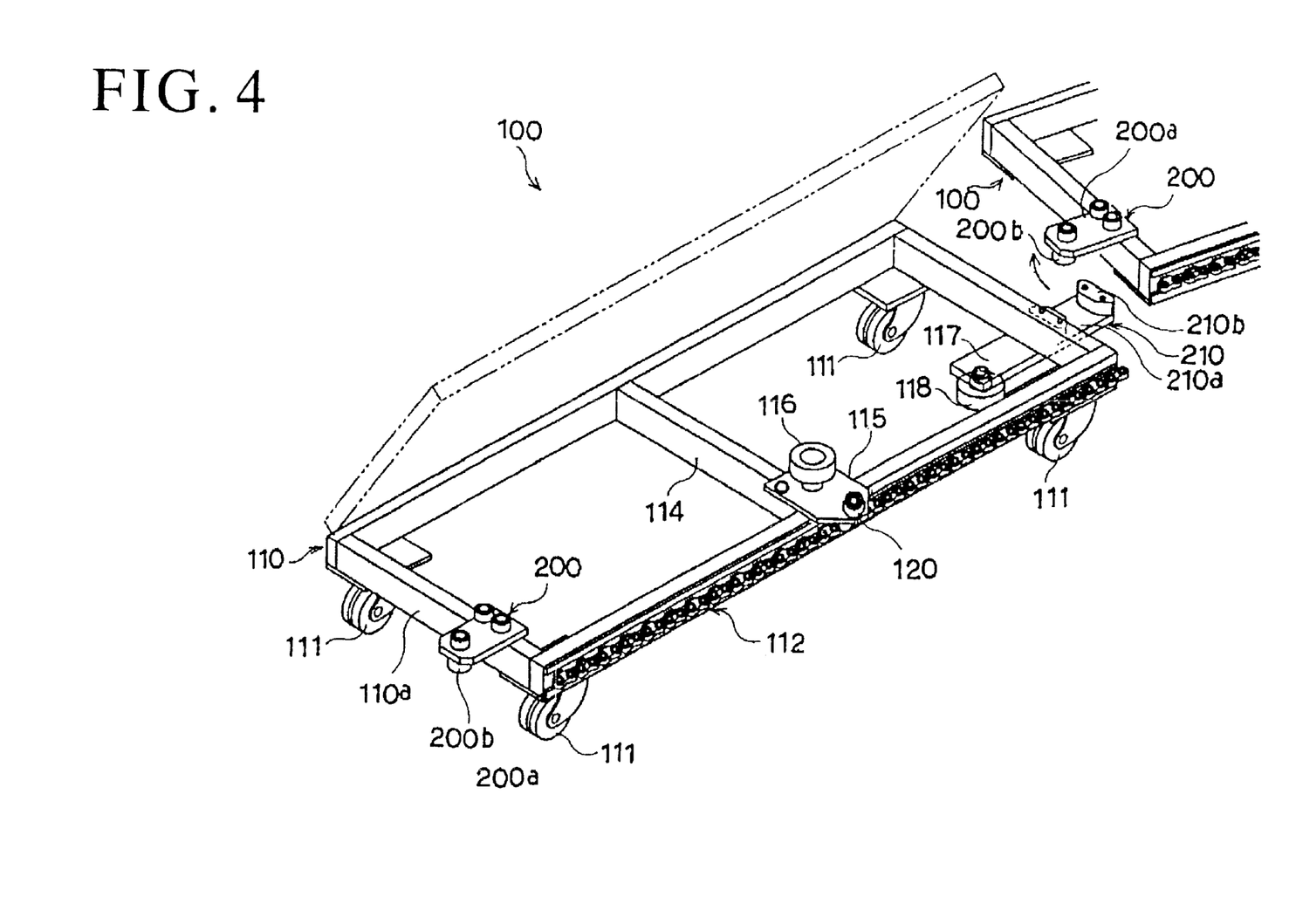
FIG. 4 is a perspective view of a carriage according to the embodiment of FIG. 1.

With reference to FIGS. 3 and 4, the carriage 100 according to this embodiment is used in a production line of wiring harnesses. The carriage 100 is comprised of a main frame 110 formed e.g. by assembling substantially rectangular pipes. A wire laying board frame 140 is mounted on top of the main frame 110 via both a hinge 102 (shown only in FIG. 3) and a slidable clamp 150 (shown only in FIG. 3) for adjusting an angle of inclination of the wire laying board frame 140.

The main frame 110 is formed e.g. of substantially rectangular pipes 110a to have a length that substantially corresponds to the length of the layout of the wiring harness to be carried by the carriage 100. The main frame 110 is substantially rectangular in plan view, and is arranged such that its longitudinal direction extends along the linear path (forward path PH1 or return path PH2) of the conveyance path PH. Casters 111 are mounted at the four corners of the main frame 110, so that the main frame 110 can move freely on the base plates 12b of the base blocks 12.

A chain 112 is secured to the outer surface of one side wall substantially extending along the longitudinal direction of the main frame 110 or carriage 100. The chain 112 is formed to mesh with the respective output sprockets 30a, 30b of the driving units 20 and defines a linear movement input member. The sprockets 30a, 30b are the output members of the driving units 20 and the chain 112 that meshes with the sprockets 30a, 30b is the input member of the carriage 100. Thus, no special coupling member is necessary to couple them with each other.

A reinforcing beam 114 extends in the widthwise direction at the longitudinal center of the main frame 110, and a cam plate 115 is secured to the upper surface of the reinforcing beam 114 to project partly outward in widthwise direction. A cam roller 116 is mounted for rotation on the cam plate 115 and is to be guided by the guide rail 26 of the upper guide cover 25. A cam plate 117 cantilevers or projects in the longitudinal direction of the main frame 110 from a downstream side with respect to a conveyance direction, and a cam roller 118 is mounted for rotation on the lower surface of the cam plate 117 and is to be guided by the angles 13 secured to the base plates 12b of the base blocks 12. The main frame 110 can be circulated along the conveyance path PH on the base blocks 12 by the above guiding construction of the cam rollers 116, 118.

Figure 5:
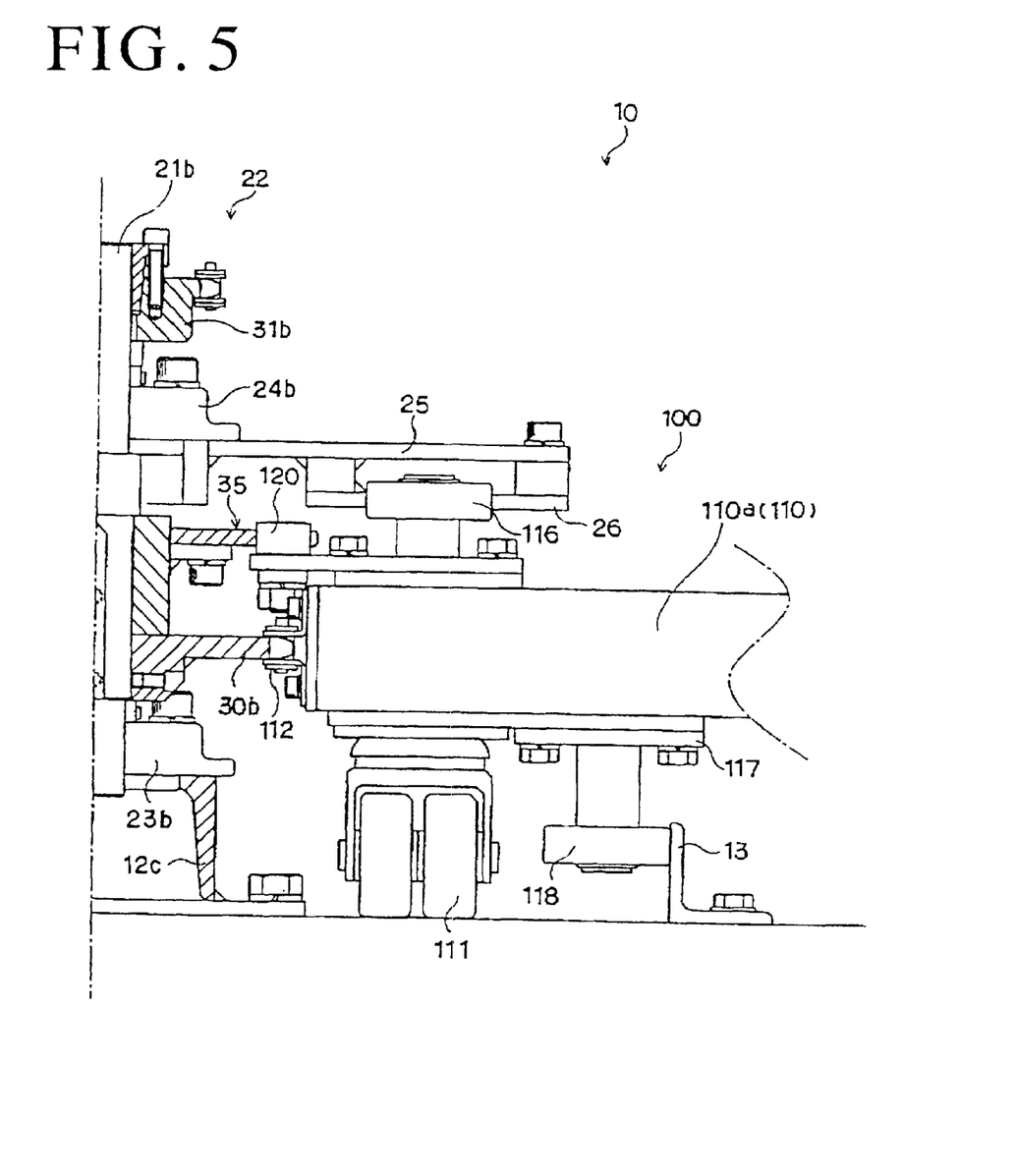
FIG. 5 is an enlarged partial section showing an essential portion of the embodiment of FIG. 1.
Figure 6:
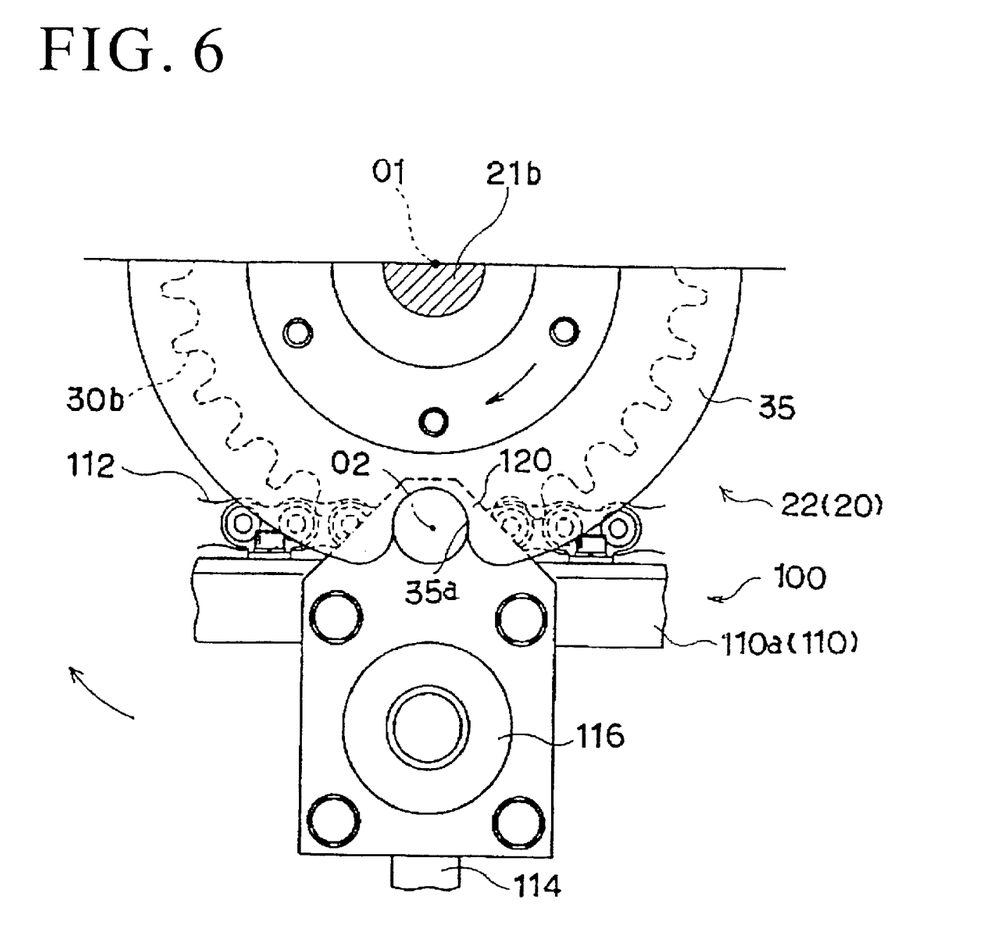
FIG. 6 is a schematic partial plan view showing a meshed state of a cam follower and a cam.

A cam 120 is mounted on the upper surface of a free end of the cam plate 115 and function as the turning movement input member. With reference to FIGS. 5 and 6, the cam 120 is a rotatable member with a substantially circular cross section. The cam follower 35 has a recess 35a, which is detachably engageable at least partly with the outer circumferential surface of the cam 120. The recess 35a is engaged with the cam 120 at a position where a center O1 of the shaft 21b of the other sprocket unit 22 and a center O2 of the cam 120 are located on a horizontal line substantially normal to the linear forward path PH1 or the linear return path PH2. By locking the output sprocket 30b fixed to the shaft 21b and the chain 112 of the carriage 100 within a range of 180° in this way, a torque of the output sprocket 30b is transmitted directly to the carriage 100 and turns the carriage 100.

Figure 7:
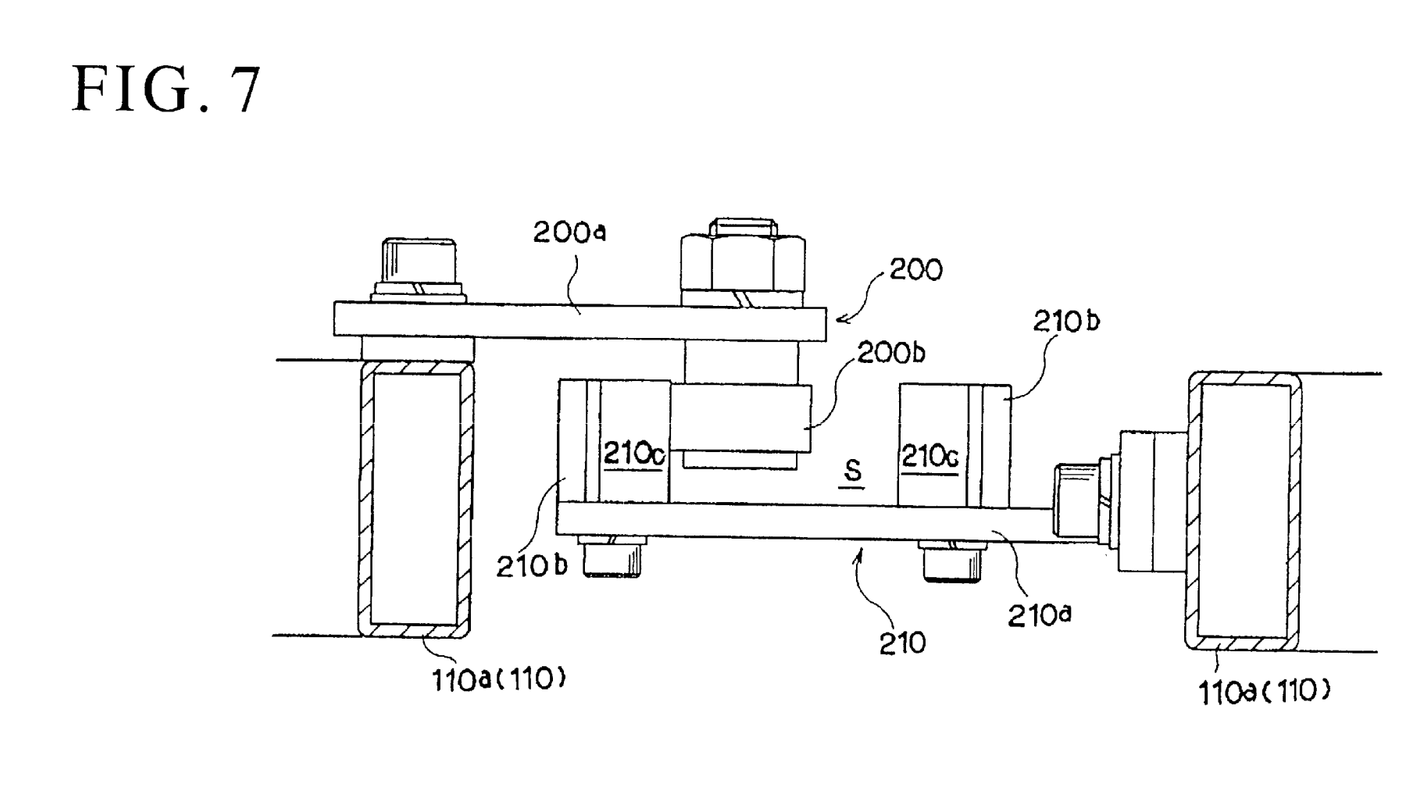
FIG. 7 is a schematic partial section showing a coupling construction of a driving member and a driven member as a carriage coupling means.

The main frame 110 of each carriage 100 is provided with a driving member 200 and a driven member 210 as a carriage coupling means. With reference to FIGS. 4 and 7, the driving member 200 is comprised of a plate 200a which cantilevers or projects from an upstream end of the carriage 100 with respect to the conveyance direction, and a rotatable cam 200b, which is mounted on the lower surface of the plate member 200a. The driven member 210 is comprised of a plate member 210a, which cantilevers or projects from a downstream end of the succeeding carriage 100, and a pair of projections 210b mounted on the upper surface of the plate member 210a. The projections 210b are spaced apart in the longitudinal direction of the carriages 100 and are formed with cam surfaces 210c so that the rotatable cam 200b can be fitted into and withdrawn from an engaging space S defined between the projections 210b. The cam surfaces of the projections 210b can transmit a force of the rotatable cam 200b for moving along the longitudinal direction of the carriage 100 to the main frame 110 on which the driven member 210 is mounted. The cam surfaces of the projections 210b permit the rotatable cam 200b to be fitted into and withdrawn from the engaging space S, if the rotatable cam 200b moves in a direction substantially normal to the above direction. By this construction, the driving member 200 can be coupled with the driven member 210 to transmit a force for moving along the linear path to the succeeding carriage 100, and permit the rotatable cam 200b to disengage from the cam surface 210c by its rotation during a transition from the downstream end of the linear path PH1 or PH2 to the turning path PH3 or PH4. When the carriage 100 returns to the linear path PH1 or PH2 from the turning path PH3 or PH4, the driving member 210 of this carriage 100 is coupled with the driving member 200 of the preceding carriage 100 by the rotation of the rotatable cam 200b to couple this carriage 100 with the preceding carriage 100.

Figure 8:
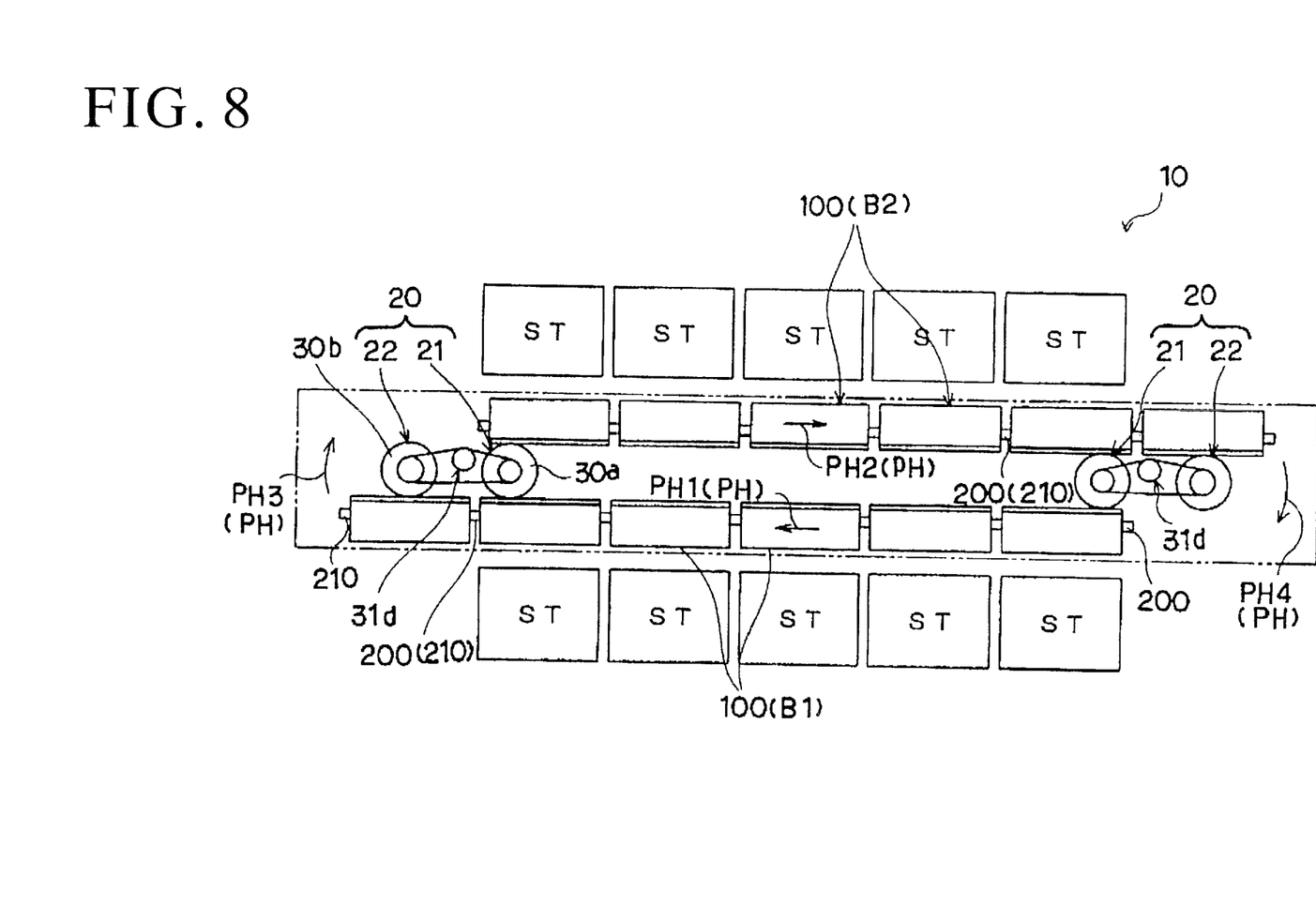
FIGS. 8 to 11 are schematic plan views showing conveyance of the carriages according to the embodiment of FIG. 1.

With reference to FIG. 8, the driving members 200 and the driven members 210 of the respective carriages 100 are coupled with each other while the carriages 100 are arranged one after another along the forward and return paths PH1, PH2 of the conveyance path PH, in the above construction. Accordingly, the carriages 100 are grouped into a coupled unit B1 that extends along the forward path PH1 and a coupled unit B2 that extends along the return path PH2. The coupled units B1, B2 preferably are substantially symmetrically arranged between the forward side and the return side to maintain a linked motion. However, the carriages 100 also may be provided asymmetrically, e.g. five carriages on path PH1 and four carriages on path PH2. In this state, pairs of the driving units 20 simultaneously drive the output sprockets 30a, 30b at the same speed, and some (two upstream located ones in the illustrated example) of the carriages 100 that form the coupling units B1, B2 are driven by the output sprockets 30a, 30b. Thus, the respective carriages 100 can be conveyed along a conveyance direction D.

Figure 9:
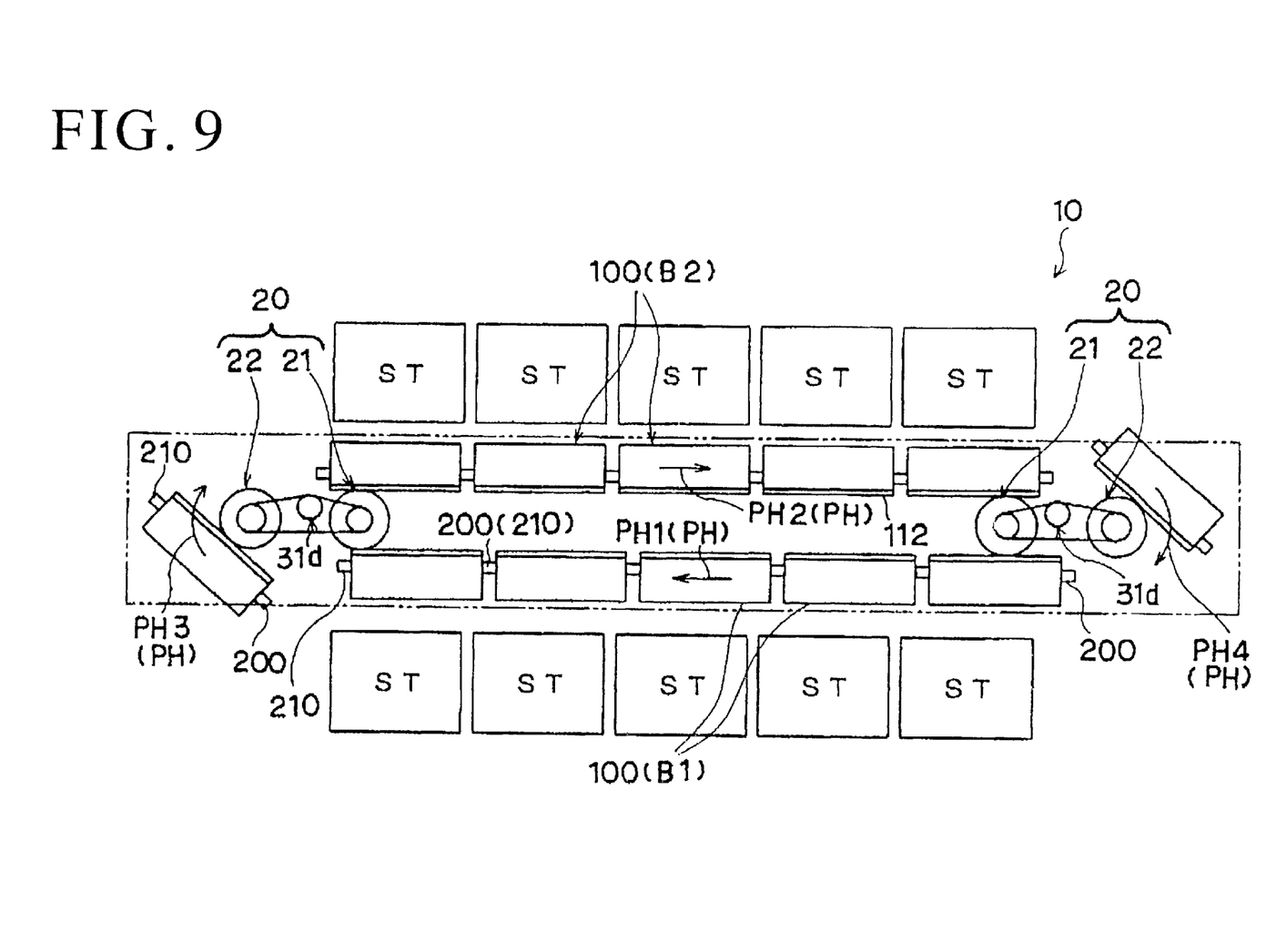
Figure 10:
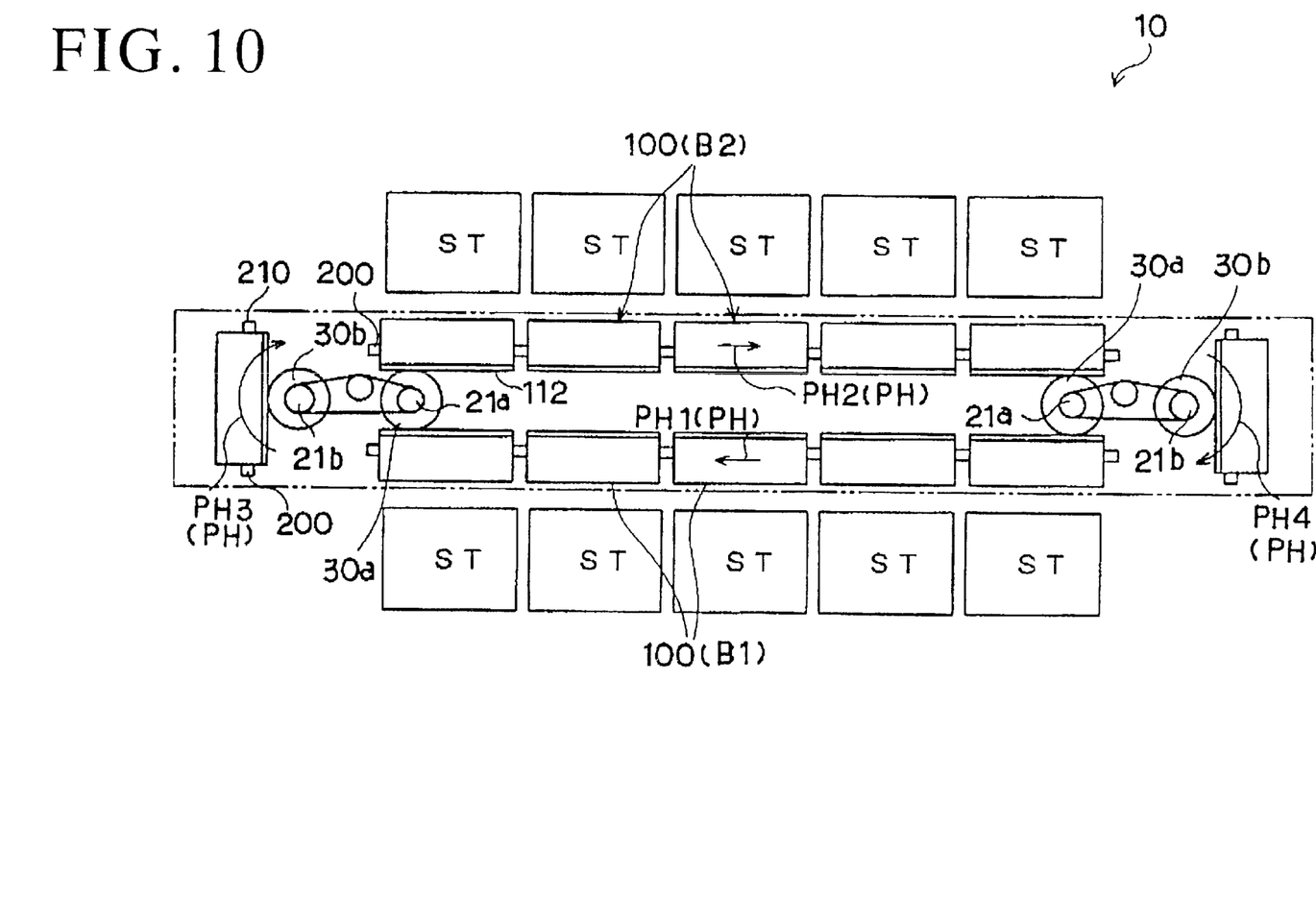

The cams 120 and the recesses 35a can be engaged with each other at positions where the centers O1 (see FIG. 6) of the shafts 21b of the sprocket units 22 and the centers O2 (see FIG. 6) of the cams 120 of the carriages 100 at the downstream ends of the respective coupled units B1, B2 are located on horizontal lines substantially normal to the linear paths PH1 and PH2, as shown in FIG. 6. In this position, only the carriages 100 at the downstream ends are separated from the coupled units B1, B2 by the constructions of the respective members 200, 210 as the carriage coupling means, shown in FIG. 9. In this state, the separated carriages 100 turn about the corresponding shafts 21b, respectively, as shown in FIGS. 9 and 10. On the other hand, the carriage 100 located at the downstream end of each coupled unit B1, B2 after such separation is linearly moved by the one output sprocket 30a to the downstream side substantially in synchronism with the turning of the separated carriage 100. Therefore, the carriages 100 can circulate from the upstream side to the downstream side along the conveyance path PH at a constant speed without interruption.

Figure 11:
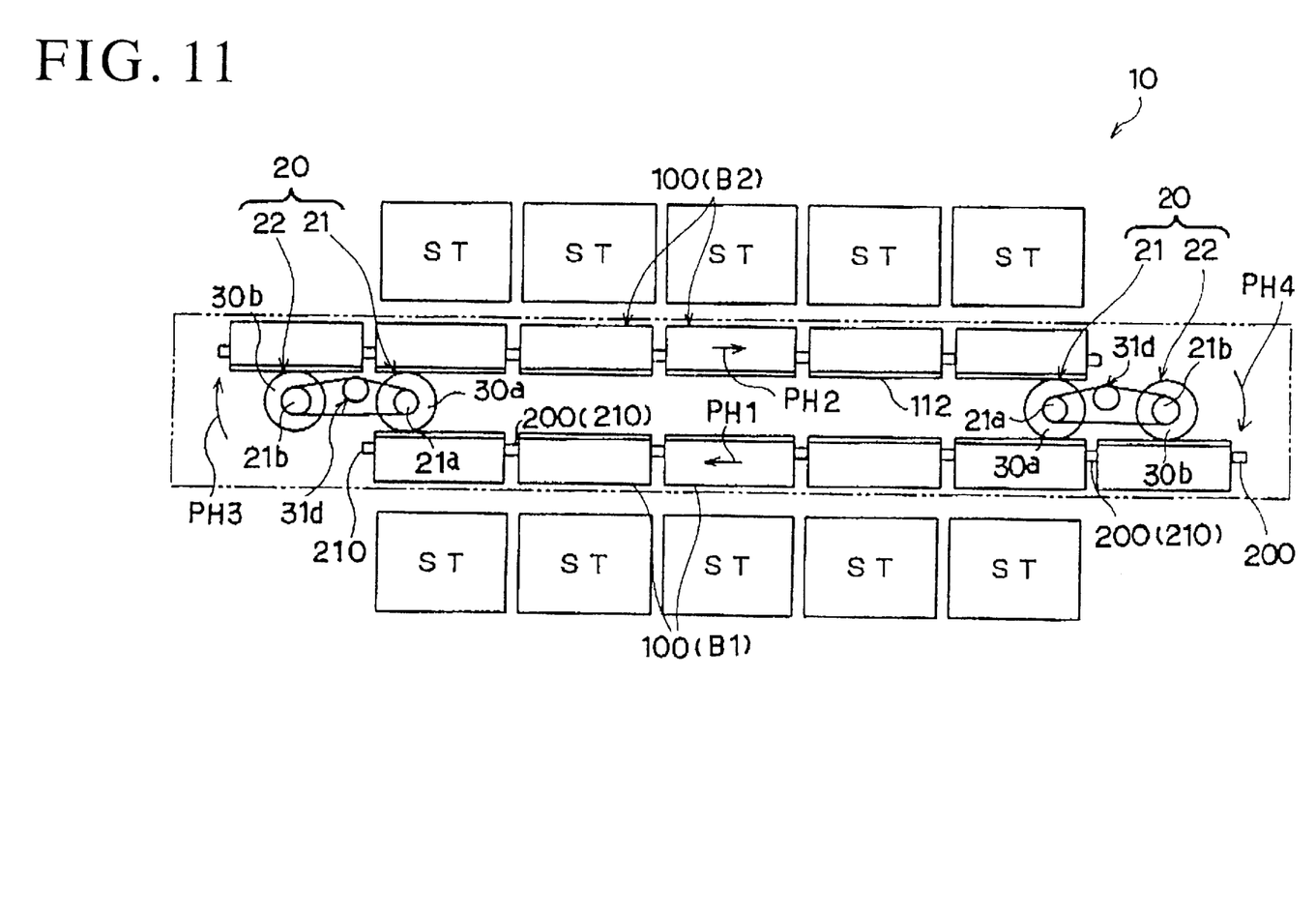

The separated carriages 100 turn about the corresponding output sprockets 30b by 180°, and then the driven members 210 of these turned carriages 100 are coupled with the driving members 200 of the carriages 100 of the coupled units B1, B2 immediately downstream therefrom. Thus, all of the carriages 100 are coupled with either the coupled unit B1 or B2 again as shown in FIG. 11. Therefore, the carriages 100 can be moved together by driving only the downstream carriages 100 of the coupled units B1, B2.

The above construction can easily accommodate a change in the number of the stations ST merely by changing the number of the base blocks 12 (see FIG. 1) to increase or decrease the space between the driving units 12 and accordingly changing the number of the carriages to be coupled. Thus, unlike the prior art, it is not necessary to change the length of the endless chain and to couple the carriages again with the changed endless chain. As a result, a change in specification of the stations can be accommodated easily at each stage of operation.

The height of the carriages 100 can be set lower by as much as the height of the table 11 in the illustrated embodiment because the conveyance path PH is formed on the table 11 having a specified height. Thus, the carriages 100 can be formed smaller. This eliminates a possibility of damaging a floor surface and facilitates maintenance, such as cleaning.

The foregoing embodiment is merely an illustration of a preferred specific example of the present invention, and the present invention is not limited thereto.

Figure 12:
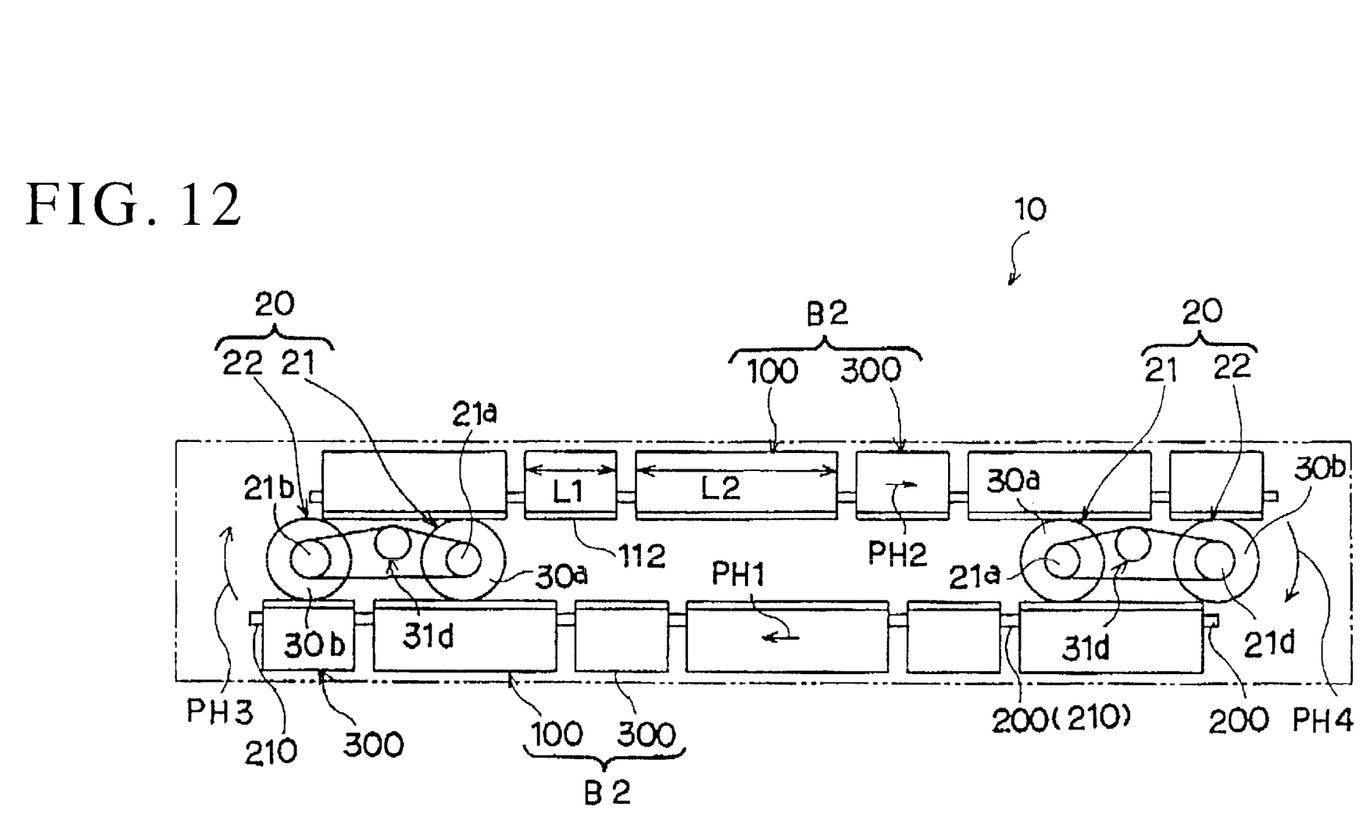
FIG. 12 is a schematic plan view showing another embodiment of the invention.

FIG. 12 is a schematic plan view showing another embodiment of the invention. As shown in FIG. 12, carriages 100, 300 having lengths L1, L2 at a ratio e.g. of 1:2 may be alternately arranged.

Various other changes can be made within the scope of the present invention as claimed.

As described above, the respective carriages can be circulated only by providing a pair of driving units at the opposite ends of the conveyance path and driving the downstream ends of the forward moving coupled units and the returning coupled units. As a result, in the case that the conveyance path is changed, a change in specification can be accommodated easily merely by changing the space between the pair of driving units and the number of the carriages coupled. Thus, unlike the prior art, it is not necessary to change the length of the endless chain and to couple the carriages again with the changed endless chain. This provides a remarkable effect of easily changing specification at each stage of operation.

What is claimed is:

1. A carriage for an endless conveyor having an endless conveyance path comprising at least two substantially linear paths and turning paths connecting opposite ends of the substantially linear paths, the conveyor having a plurality of carriages driven by a pair of driving units of the conveyor in proximity to the turning paths to circulate the carriages along the conveyance path in a predetermined conveyance direction, the carriage comprising:

a torque input member for receiving a torque from the driving unit for moving the carriage in the conveyance direction, and a carriage coupling means for connecting the carriages such that the torque received by one of the carriages on the conveyance path from the driving unit can be transmitted to the succeeding ones of the carriages, wherein the carriage coupling means separates a leading one of the carriages from a succeeding one of the carriages when the leading carriage moves from one linear path to the turning path while coupling the separated carriage with a preceding one of the carriages when the carriage moves from the turning path to another linear path.

2. A carriage according to claim 1, wherein the carriage coupling means comprises at least a driving member and a driven member.

3. A carriage according to claim 2, wherein the driving member comprises a rotatable cam on one of the carriages and the driven member comprises projections mounted on an adjacent one of the carriages, wherein the projections are spaced apart substantially in the longitudinal direction of the carriages and are formed with corresponding cam surfaces so that the rotatable cam can be fitted into and withdrawn from an engaging space defined between the projections.

4. A carriage according to claim 1, wherein the torque input member has a linear movement input member for transmitting an output of a linearly driving member of the endless conveyor to the carriage by being detachably couplable to the linearly driving member, and a turning movement input member for transmitting a torque of a turning member of the endless conveyor to the carriage to turn the carriage by being detachably couplable to the turning member.

5. A conveying mechanism for circulating a plurality of carriages in a predetermined conveyance direction along an endless conveyance path comprised of at least two substantially linear paths and turning paths connecting opposite ends of the substantially linear paths, a pair of driving units for driving the respective carriages, wherein each of the driving units comprises:

turning means for separating the carriages located at downstream ends of coupled units of the respective carriages coupled along the substantially linear paths and turning them along the turning paths, and linear movement output members which operate in synchronism with the turning means to convey the downstream ends of the coupled units coupled along the substantially linear paths to the turning means.

6. A conveying mechanism according to claim 5, wherein the two driving units are disposed respectively at the opposite ends and between the substantially linear paths for driving the respective carriages.

7. A conveying mechanism according to claim 6, wherein the turning means comprises a cam follower and a rotatable cam.

8. A conveying mechanism according to claim 7, wherein the conveyance path is formed on a table having a specified height.

9. A conveying mechanism according to claim 8, further comprising a plurality of base blocks arranged one after another, wherein the base blocks comprise path defining means for defining the conveyance path on the base blocks.

10. A conveying mechanism comprising:

two linear paths each said linear path having an entry and an exit;

two non-linear turning paths extending from the exits from the linear paths;

a plurality of carriages moveably positioned along a selected one of said paths, each said carriage having an upstream coupling member and a downstream coupling member, the upstream and downstream coupling members being configured for transmitting a pulling force between adjacent carriages when the upstream and downstream coupling members of the adjacent carriages are substantially linearly aligned along one of the linear paths, the downstream coupling member of any of said carriages being separable from the upstream coupling member of any of said carriages by turning any of said carriages onto one of the turning paths; and two driving units, each said driving unit having a linear movement output member in proximity to the exit of one of the linear paths and a turning movement output member in proximity to one of the turning paths, the linear movement output members exerting a pulling force for pulling toward the exits all of the carriages on the linear paths by engaging the carriage closest to the respective exit, said turning movement output members being operative to move said carriages sequentially through said turning paths and to thereby disengage the carriages sequentially from said carriages remaining on the respective linear path.

11. The conveying mechanism of claim 10, wherein the turning movement output member of the first driving unit is operative for sequentially turning said carriages from the exit of the first linear path to the entry of the second linear path, and wherein the turning movement output member of the second driving unit is operative for moving said carriages sequentially from the exit of the second linear path to the entry of the first linear path.

12. The conveying mechanism of claim 11, wherein the upstream coupling member of each of said carriages is configured for movement into engagement with the downstream coupling member of an adjacent one of said carriages as said turning movement output member of the first driving unit turns the carriages sequentially onto the entry of the second linear path and as the turning movement output member of the first driving unit turns the carriages onto the entry of the first linear path.

13. The conveying mechanism of claim 12, wherein the linear movement output member of each of said first and second driving units comprises a rotatably driven wheel having sprockets, and wherein each said carriage comprises a linear movement input member extending along each said carriage, each said linear movement input member having a plurality of recesses engageable with the sprockets of the linear movement output member of each said driving unit.

14. The conveying mechanism of claim 13 wherein each said linear movement input member comprises a chain.

15. The conveying mechanism of claim 13, wherein the turning movement output member comprises a rotatable member having at least one recess, and wherein each said carriage comprises a cam engageable by the recess of the linear movement output member for turning each said carriage through the respective turning paths.

* * * * *